US012681974B2

(12) United States Patent
Koussa et al.

(10) Patent No.: US 12,681,974 B2
(45) Date of Patent: Jul. 14, 2026

(54) SYSTEMS AND METHODS FOR DATABASE CLUSTERING IN PARSING LEGAL SEARCH QUERIES

(71) Applicant: RELX Inc., Miamisburg, OH (US)

(72) Inventors: Mark Koussa, Hawthorne, CA (US); Mark Myslin, San Francisco, CA (US)

(73) Assignee: RELX Inc., Miamisburg, OH (US)

( * ) Notice: Subject to any disclaimer, the term of this patent is extended or adjusted under 35 U.S.C. 154(b) by 0 days.

(21) Appl. No.: 18/826,733

(22) Filed: Sep. 6, 2024

(65) Prior Publication Data

US 2025/0077561 A1      Mar. 6, 2025

Related U.S. Application Data

(60) Provisional application No. 63/580,830, filed on Sep. 6, 2023.

(51) Int. Cl.
| | |
|---|---|
| *G06F 16/338* | (2019.01) |
| *G06F 16/35* | (2025.01) |
| *G06F 16/353* | (2025.01) |
| *G06Q 50/18* | (2012.01) |

(52) U.S. Cl.
CPC .......... *G06F 16/338* (2019.01); *G06F 16/353* (2019.01); *G06Q 50/18* (2013.01)

(58) Field of Classification Search
None
See application file for complete search history.

(56) References Cited

U.S. PATENT DOCUMENTS

| | | | | |
|---|---|---|---|---|
| 8,290,983 | B2 * | 10/2012 | Meyer ................. | G06F 16/9535 707/791 |
| 8,849,789 | B2 * | 9/2014 | Meyer ................. | G06F 16/9535 707/706 |
| 9,177,050 | B2 * | 11/2015 | Lu ........................... | G06F 16/38 |
| 9,367,604 | B2 * | 6/2016 | Lu ........................... | G06F 16/93 |
| 10,635,679 | B2 * | 4/2020 | Miller .............. | G06F 16/24578 |
| 11,132,755 | B2 * | 9/2021 | Raphael ................... | G06N 5/02 |
| 2002/0123902 | A1 * | 9/2002 | Lenore ................... | G06Q 10/10 705/311 |
| 2003/0009345 | A1 * | 1/2003 | Thorpe .................. | G06Q 10/10 705/311 |
| 2005/0278633 | A1 * | 12/2005 | Kemp ..................... | G06F 16/93 715/713 |
| 2015/0269691 | A1 * | 9/2015 | Bar Yacov ............ | G06F 16/334 705/311 |
| 2018/0365317 | A1 * | 12/2018 | Chong .................. | G06Q 50/18 |
| 2021/0216576 | A1 * | 7/2021 | Staub ................. | G06Q 30/0282 |
| 2024/0119547 | A1 * | 4/2024 | Lechtenberg ....... | G06F 16/3334 |

* cited by examiner

*Primary Examiner* — Debbie M Le
(74) *Attorney, Agent, or Firm* — Dinsmore & Shohl LLP

(57)      ABSTRACT

A database clustering search system includes a processor; and a non-transitory, processor readable storage medium communicatively coupled to the processor, the non-transitory, processor readable storage medium including one or more instructions stored thereon that, when executed, cause the processor to: receive input comprising a search query; deploy a search based on the input; populate a list that refers to one or more content types; and output the list to a user device.

19 Claims, 6 Drawing Sheets

400

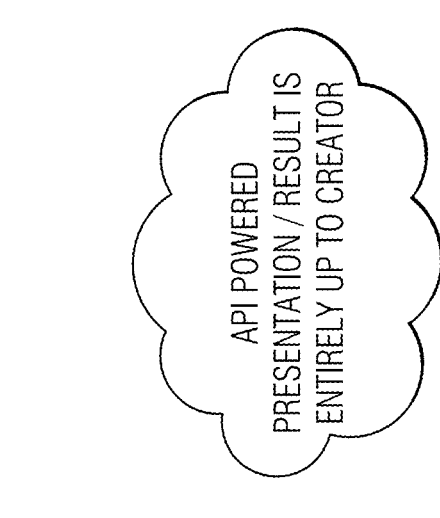

API POWERED PRESENTATION / RESULT IS ENTIRELY UP TO CREATOR

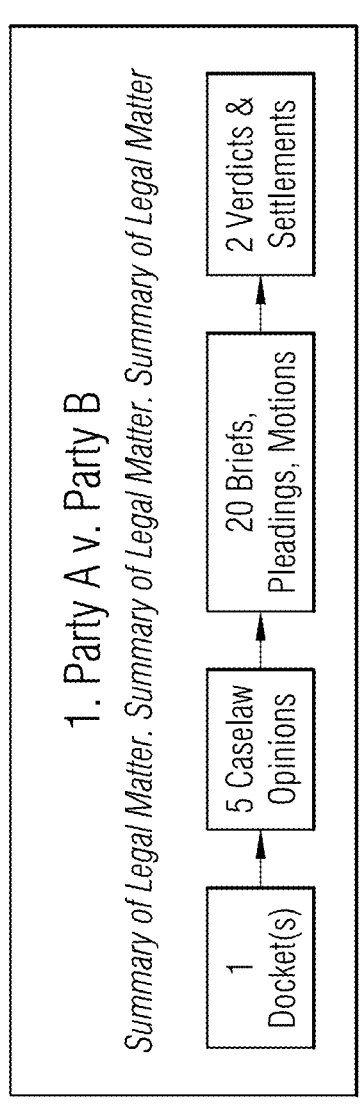

1. Party A v. Party B

*Summary of Legal Matter. Summary of Legal Matter. Summary of Legal Matter*

| 1 Docket(s) | → | 5 Caselaw Opinions | → | 20 Briefs, Pleadings, Motions | → | 2 Verdicts & Settlements |

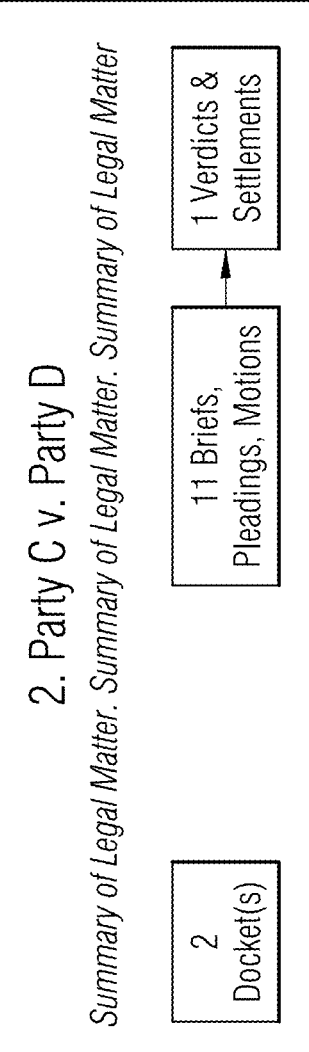

2. Party C v. Party D

*Summary of Legal Matter. Summary of Legal Matter. Summary of Legal Matter*

| 2 Docket(s) | | | | 11 Briefs, Pleadings, Motions | → | 1 Verdicts & Settlements |

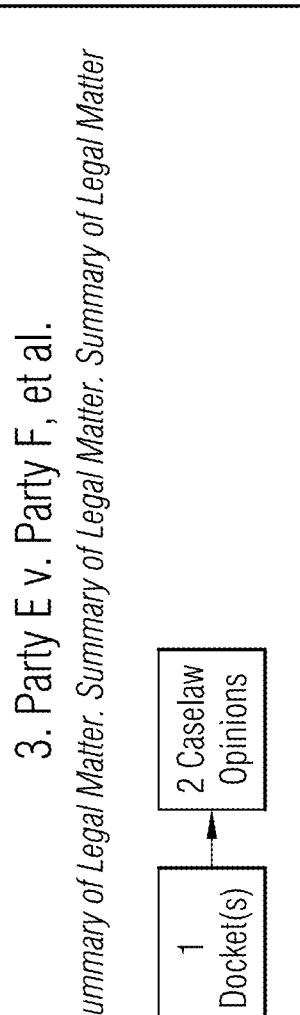

3. Party E v. Party F, et al.

*Summary of Legal Matter. Summary of Legal Matter. Summary of Legal Matter*

| 1 Docket(s) | → | 2 Caselaw Opinions |

FIG. 4

SYSTEMS AND METHODS FOR DATABASE CLUSTERING IN PARSING LEGAL SEARCH QUERIES

CROSS-REFERENCE TO RELATED APPLICATIONS

This application claims priority to U.S. Provisional Patent Application Ser. No. 63/580,830, filed Sep. 6, 2023, entitled, "SYSTEMS AND METHODS FOR DATABASE CLUS-TERING IN PARSING LEGAL SEARCH QUERIES," the entirety of which is incorporated by reference herein.

FIELD

The present disclosure generally relates to database clustering, and more particularly, to database clustering in parsing legal search queries.

BACKGROUND

When a user performs legal research, they may use keyword or natural language searching for certain content. However, searching in a single content type can limit the number of search results and cause the user to miss important documents. In addition, limitations exist as to the starting point of beginning a search query, as the user is generally searching within limited to initially searching within the single content type, and querying multiple content sources leads to increased computing load, thereby resulting in adverse system operational performance and efficiency. These and other deficiencies exist.

SUMMARY

In one aspect, a database clustering search system may include a processor; and a non-transitory, processor readable storage medium communicatively coupled to the processor. The non-transitory, processor readable storage medium may include one or more instructions stored thereon that, when executed, cause the processor to receive input comprising a search query. The non-transitory, processor readable storage medium may include one or more instructions stored thereon that, when executed, cause the processor to deploy a search based on the input. The non-transitory, processor readable storage medium may include one or more instructions stored thereon that, when executed, cause the processor to populate a list that refers to one or more content types. The non-transitory, processor readable storage medium may include one or more instructions stored thereon that, when executed, cause the processor to output the list to a user device.

In another aspect, a method to be performed by a processor of a search system is provided. The method may include receiving input comprising a search query. The method may include deploying a search based on the input. The method may include populating a list that refers to one or more content types. The method may include outputting the list to a user device.

In yet another aspect, a non-transitory, computer-readable medium may include instructions that, when executed by at least one processor, cause the at least one processor to perform one or more operations including receiving input including a search query. The one or more operations may include deploying a search based on the input. The one or more operations may include populating a list that refers to one or more content types. The one or more operations may include outputting the list to a user device.

These and other features, and characteristics of the present technology, as well as the methods of operation and functions of the related elements of structure and the combination of parts and economics of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 4 depicts a schematic diagram of an output of parsing legal search queries according to one or more aspects shown and described herein;

DETAILED DESCRIPTION

The present disclosure relates to database clustering in parsing search queries, and in particular, legal search queries. In particular, the systems and methods disclosed herein are directed to database clustering systems in parsing legal search queries. When a user performs legal research, they may use keyword or natural language searching for certain content. However, searching in only one content type can limit the number of search results and cause the user to miss important documents. In addition, limitations exist as to the starting point of beginning a search query, as the user is generally searching within case law first and thereby limited to initially searching within this particular legal content type.

The systems and methods disclosed herein provide for searching across various the different legal content types using a single search by use of a knowledge graph. The knowledge graph is defined by one or more clusters of a legal matter by pulling together the case law opinions, dockets, jury verdicts and settlements, and briefs, pleadings, and motions from a case. The knowledge graph is itself queried to return search results, for example as part of a list, that is responsive to the search query and whose display output is also customizable and also prioritized by the user in accordance with one or more user preferences. Furthermore, the systems and methods disclosed herein also provide for searching across legal dockets to extract particular information therefrom using the knowledge graph.

Figure 1:
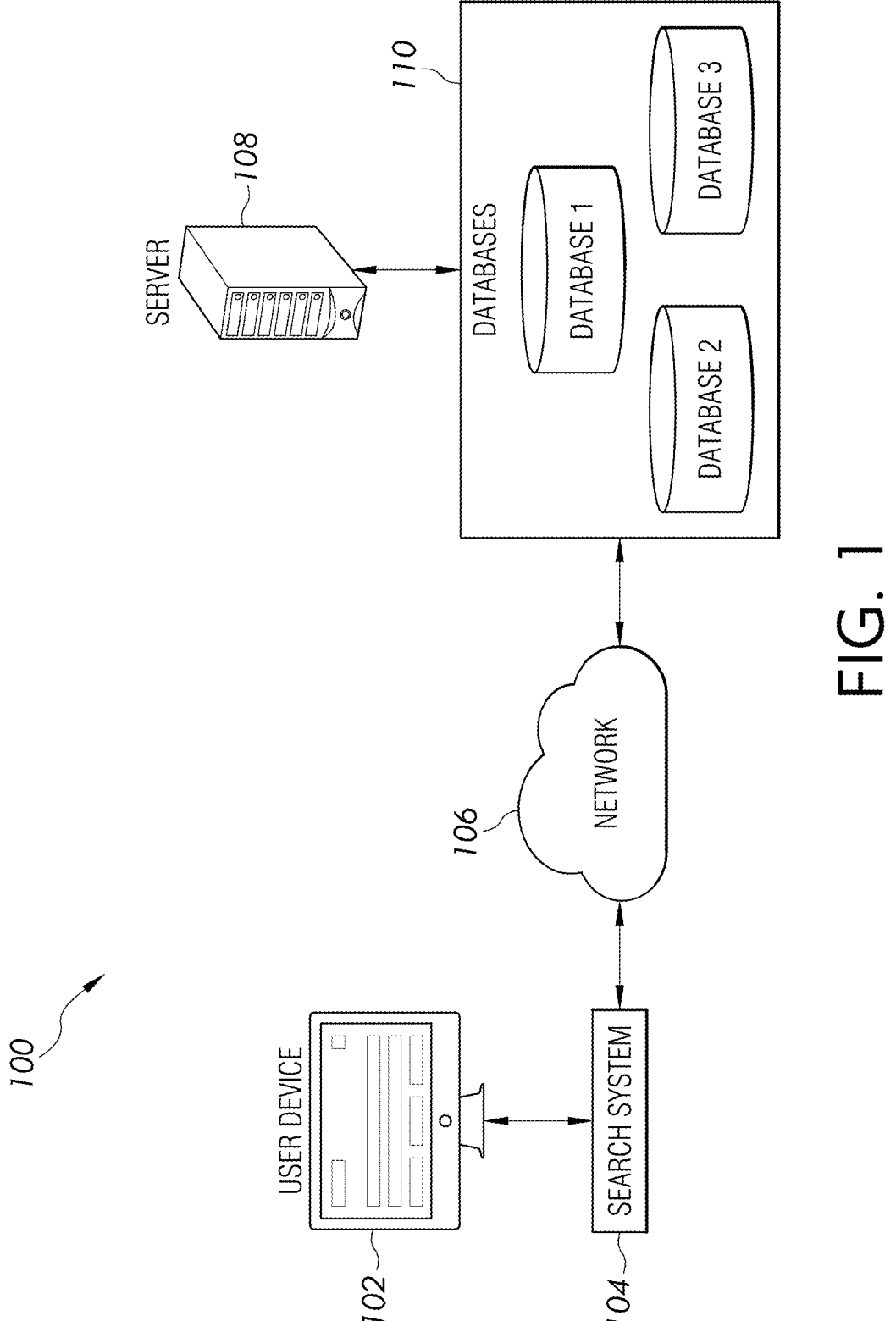
FIG. 1 depicts a schematic diagram of an example database clustering search system according to one or more aspects shown and described herein.

FIG. 1 depicts a schematic diagram of an example database clustering search system 100. In particular, FIG. 1 depicts a database clustering search system 100 in an environment including a user device 102, a search system 104, a network 106, one or more databases 110, and a server 108. Although single instances of the constituent components of the database clustering search system 100 are depicted, any number of constituent components may be included.

The user device 102 may include any computing device (e.g., a personal computer, a tablet computer, a cellular telephone, a smartphone or other smart device, a stateless device, or the like), may be used by a user to interact, including but not limited to submitting any number of search queries via a communication interface, with the search system 104 or any constituent component of the database clustering search system 100. In certain embodiments, the user device 102 may include a remote computing device, such as one or more processing devices. By way of example, the processing device may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. The processing device also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The search system 104 may include a processor 202 and a non-transitory processor readable storage medium 204 in communication therewith. As will be further described with reference to FIG. 2, the search system 104 may be configured to parse one or more search queries, such as a legal search query. The processor 202 of the search system 104 may be configured to perform any number of operations of a legal matter linking algorithm, which may be stored in the non-transitory processor readable storage medium 204, as described below with reference to FIG. 2.

The network 106 may be in data communication with any of the components of the database clustering search system 100. The network 106 may be one or more of a wireless network, a wired network or any combination of wireless network and wired network and may be configured to connect any of the components of the database clustering search system 100. For example, network 106 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 106 may include, without limitation, telephone lines, fiber optics, IEEE Ethernet 802.3, a wide area network, a wireless personal area network, a LAN, or a global network such as the Internet. In addition, network 106 may support an Internet network, a wireless communication network, a cellular network, or the like, or any combination thereof. Network 106 may further include one network, or any number of the exemplary types of networks mentioned above, operating as a stand-alone network or in cooperation with each other. Network 106 may utilize one or more protocols of one or more network elements to which they are communicatively coupled. Network 106 may translate to or from other protocols to one or more protocols of network devices. Although network 106 is depicted as a single network, it should be appreciated that according to one or more examples, network 106 may include a plurality of interconnected networks, such as, for example, the Internet, a service provider's network, a cable television network, corporate networks, such as credit card association networks, and home networks.

The server 108 may be configured to retrieve any data from the one or more databases 110. The server 108 is configured as a central system, server or platform to control and call various data at different times to execute a plurality of workflow actions. The server 108 is configured to connect to any of the constituent components of the database clustering search system 100. For example, the server 108 is configured to receive one or more requests from the search system 104. Based on the one or more requests from the search system 104, the server 108 is configured to retrieve the requested data from one or more databases 110. Based on receipt of the requested data from the one or more databases 110, the server 108 is configured to transmit the received data to the search system 104, the received data being responsive to one or more requests, and includes without limitation the legal content types of data and their respective legal content metadata.

The one or more databases 110, including but not limited to DB1, DB2, DB3 may be configured to store and transmit any number of legal content types of data, including respective legal content metadata. All legal content metadata may be stored in a single database. In other examples, one or more databases DB1, DB2, DB3 may store different legal content types of data. The one or more databases DB1, DB2, DB3 may be in data communication with the search system 104, server 108, and the user device 102 via the network 106.

Figure 2:
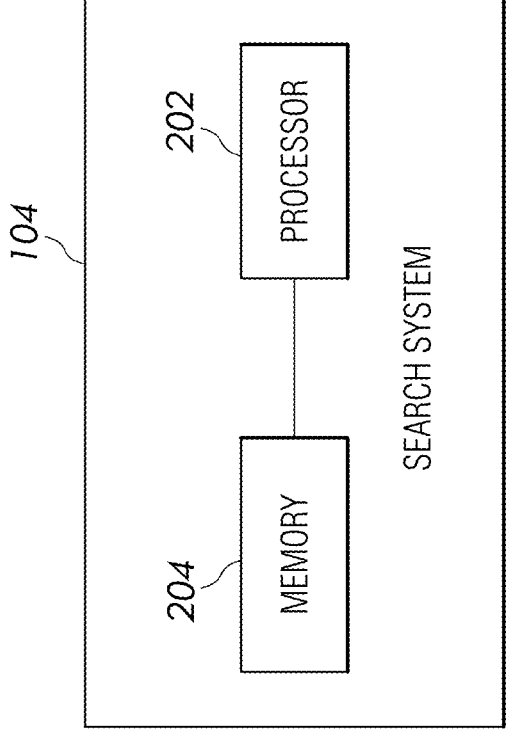
FIG. 2 depicts a schematic diagram of an example search system of the database clustering search system of FIG. 1 according to one or more aspects shown and described herein.

FIG. 2 depicts a schematic diagram of an example search system 104 of the database clustering search system 100. In particular, FIG. 2 depicts a search system 104 including a processor 202 and a non-transitory, processor readable storage medium 204. Although single instances of the constituent components of the search system 104 are depicted, any number of constituent components may be included.

The processor 202, such as a central processing unit (CPU), may be the central processing unit that is configured to perform calculations and logic operations to execute one or more programs. The processor 202, alone or in conjunction with the other components, may be an illustrative processing device, computing device, processor, or combinations thereof, including, for example, a multi-core processor, a microcontroller, a field-programmable gate array (FPGA), or an application-specific integrated circuit (ASIC). The processor 202 may include any processing component configured to receive and execute instructions (such as from the non-transitory, processor readable storage medium 204). In some embodiments, the processor 202 may include a plurality of processing devices.

The non-transitory, processor readable storage medium 204 may contain one or more data repositories for storing data that is received and/or generated. The non-transitory, processor readable storage medium 204 may be any physical storage medium, including, but not limited to, a hard disk drive (HDD), memory (e.g., read-only memory (ROM), programmable read-only memory (PROM), random access memory (RAM), double data rate (DDR) RAM, flash memory, and/or the like), removable storage, a configuration file (e.g., text) and/or the like. While the non-transitory, processor readable storage medium 204 is depicted as a local device, it should be understood that the non-transitory, processor readable storage medium 204 may be a remote storage device, such as, for example, a server computing device, cloud-based storage device, or the like. The non-transitory, processor readable storage medium 204 may be communicatively coupled to the processor 202.

The search system 104 may further include one or more interface components (not shown) that are generally hardware components that provide an interface with a user or an external device. For example, the one or more interface components may include user interface components, communications hardware, and/or the like. Illustrative examples of the one or more interface components include, but are not limited to, hardware components that receive inputs from a user and transmit signals corresponding to the inputs, such as a keyboard, a mouse, a joystick, a touch screen, a remote control, a pointing device, a video input device, an audio input device, a haptic feedback device, a touchscreen and/or the like. Other illustrative examples of the one or more interface components include, but are not limited to, network interface hardware (e.g., wired or wireless networking hardware), such as a modem, LAN port, wireless fidelity (Wi-Fi) card, WiMax card, mobile communications hardware, and/or other hardware for communicating with other networks and/or devices. Other devices that may be used for the one or more interface components not specifically described herein are contemplated and included in the scope of this disclosure.

When a user performs legal research, they may use keyword or natural language searching for certain content. However, searching in only one content type can limit the number of search results and cause the user to miss important documents. In addition, limitations exist as to the starting point of beginning a search query 301, as the user is generally searching within case law first and thereby limited to initially searching within this particular legal content type.

By way of example, a user may be looking to see whether an expert named John Doe has ever worked on an OSHA case where a brain injury is alleged. The user may run a case law search for "John Doe and brain injury and OSHA". Zero results may be returned because the name John Doe does fails to appear in the case law; however, the name John Doe does appear in a jury verdict. The user would have had results had they performed the search in verdicts and settlements, which is a different legal content type than that of the case law. In this manner, the user would have to search separate legal content types, individually, and thereby piece-meal results of each searched legal content type. This approach, including querying multiple legal content types (which may be in different databases) is inefficient, resulting in adverse delays and increased computing load and system services.

The search system 104 is configured to search across all of the different legal content types (including but not limited to legal opinions; briefs, pleadings and motions; verdicts and settlements; and dockets) using a single search by use of a knowledge graph. The knowledge graph may be generated by the processor 202, and defined by one or more clusters of a legal matter by pulling together the case law opinions, dockets, jury verdicts & settlements, and the briefs, pleadings, and motions from a case. An algorithm called "legal matter linking" may be configured to generate the one or more clusters. In some examples, the knowledge graph includes a graph database. Without limitation, the graph database includes a Neptune graph. However, it is understood that other types of graph databases may be used. The knowledge graph is itself queried to return search results responsive to the search query 301.

Figure 3:
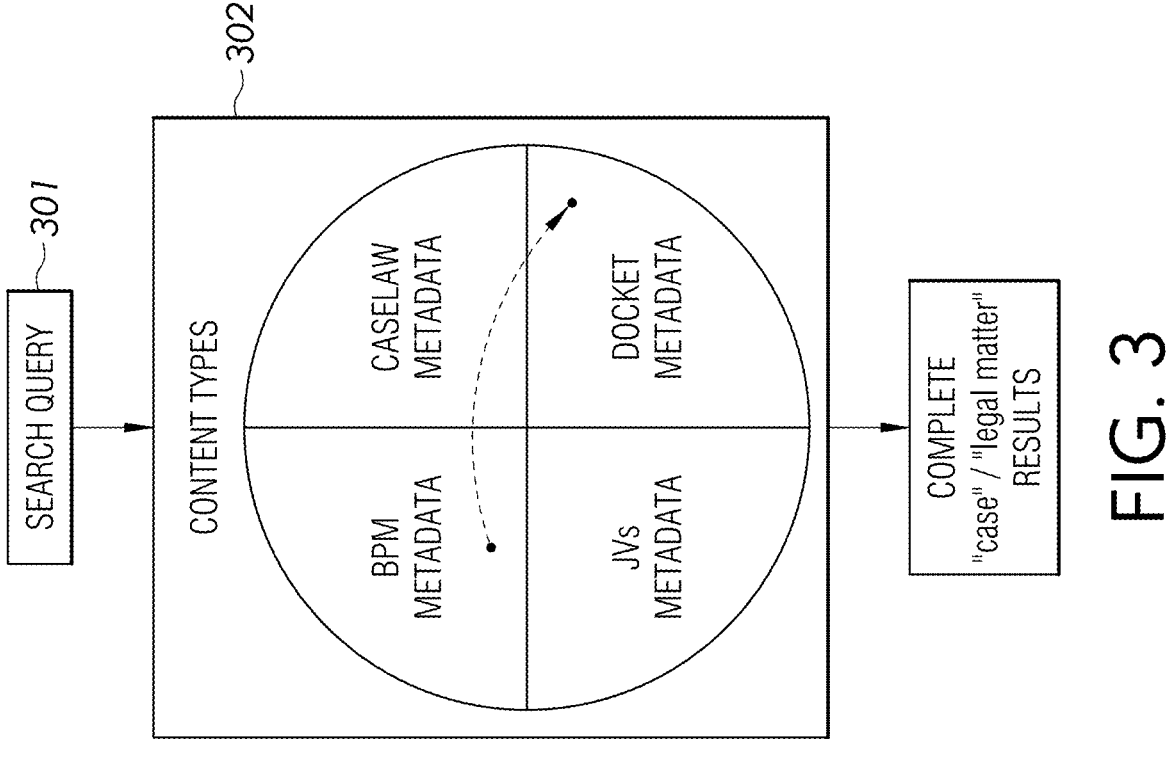
FIG. 3 depicts a schematic diagram of parsing legal search queries by the database clustering search system of FIG. 1 according to one or more aspects shown and described herein.

In some examples, and briefly referring to FIG. 3, a search may be deployed that takes the user's search query 301, such as via input from a user device 102, and runs it against a supercluster that searches each of the following legal content types 302 at once: case law opinions, dockets, jury verdicts & settlements, and briefs, pleadings, and motions (which may be each associated with corresponding metadata). For any hit that is receiving from querying any of those content types 302, the processor 202 may be configured to relate it back to the legal matter cluster. The processor 202 may be configured to populate a result list that refers to legal matters, rather than an individual legal content type, which is then presented (such as via display of a user interface of the user device 102) to the user.

In other examples, the legal matters may be pre-aggregated by the processor 202 into a single document per matter, which is configured to concatenate data from each legal content type (for example, case law opinions, dockets, jury verdicts & settlements, and briefs, pleadings, and motions, which may be each associated with corresponding metadata). These corresponding resulting whole-matter documents may then be searched, for example by a search query 301 input by the user via the user device 102, and executed by the processor 202. The legal matter may represent the case itself, and links that are clickable or otherwise activated, may be displayed that show whether there are specific legal content types (such as case law opinions and/or dockets and/or jury verdicts and/or briefs, pleadings, and motions), as well as indicate each of these specific legal content types that are available for selection. Without limitation, the output result list and/or the links within the result list, as well as its display, may be prioritized according to one or more user preferences including rank, relevance, date, name, specific legal content type, and/or any combination thereof, or the like.

In still other examples, the entire legal matters may be pre-clustered in the knowledge graph, and the legal matter cluster itself may be searched by a search query 301 input by the user via the user device 102, and executed by the processor 202.

In the expert example above, using the knowledge graph, a hit for John Doe and brain injury and OSHA in verdicts & settlements may cause data from the other three content types 302 (such as briefs, pleadings and motions, legal opinions, and dockets) to be integrated into a "legal matter" that is custom displayed in accordance with one or more user preferences, where a user can click into the different content types via the correspond ding link to review the results for the search query 301 input by the user via the user device 102.

With reference to FIG. 2 and as shown at the parsing process 300 of FIG. 3, the processor 202 may be configured to receive input comprising a search query 301. By way of example, the search query 301 may contain one or more keywords associated with a legal matter that is desired to be found within a database 110, and more particularly, within one or more content types of a single database 110, as will be further explained below. The search query 301 may be input from the user device 102.

The processor 202 may be configured to deploy a search based on the input. In certain embodiments, the processor 202 may be configured to deploy the search based on the input against the database 110 (such as a single database or two or more databases) including the one or more content types 302. For example, the processor 202 may be configured to deploy the search based on the received input against one or more relevant keywords found in a content type 302, such as briefs, pleadings and motions, stored in the database 110. The one or more relevant keywords may be searched by the processor 202 against stored keywords in the database 110 to determine a type of match, such as an exact match or a partial match, of where the keyword(s) appear within the pleadings and motions content type 302.

Still further, the one or more relevant keywords may be searched by the processor 202 against other stored keywords in the database 110 for other content types 302, and is not limited to a single content type. For example, the one or more relevant keywords of the search query 301 may be extracted by the processor 202 and searched, simultaneous, against one or more relevant keywords found in a case law content type and a dockets content type stored in the database 110.

The processor 202 may be configured to populate a list that refers to one or more content types 302. By way of example, and without limitation, the one or more content types 302 may include case law, briefs, pleadings and motions, verdicts and settlements, dockets, or any combination thereof, as previously discussed.

The processor 202 may be configured to output the list 400 (see FIG. 4). In certain embodiments, the processor 202 may be configured to output the list 400 to the user device 102. The processor 202 may be configured to output, to the user device 102, including additional information. For example, the additional information may include one or more links that correspond to each of the one or more content types 302. In certain embodiments, the processor 202 may be configured to generate and transmit a prompt, to the user device 102, requesting a selection of the one or more links that correspond to the one or more content types 302. In certain embodiments, the processor 202 may be configured to receive, in response to the prompt, the selection of the one or more links that correspond to the one or more content types 302.

For example, the selection of a first link may correspond to a first content type including case law, and the selection of a second link may correspond to a second content type including verdicts and settlements. Without limitation, the selection of the first link may be performed by the user device 102, such as via activation of a button associated with the first link. In other embodiments, it is not necessary for the processor 202 to be configured to generate and transmit the prompt requesting the selection of the one or more links that correspond to the one or more content types 302.

The processor 202 may be configured to generate a display including the selection of the one or more links corresponding to the one or more content types 302. By way of example, the processor 202 may be configured to generate the display, such as on a display screen of the user device 102, that includes the first link and/or the first content type including the case law that is associated with the search query 301. Additionally or alternatively, the processor 202 may be configured to generate the display that includes the second link and/or the second content type including the verdicts and settlements that is associated with the search query 301.

Prior to, or after output of the list, in certain embodiments, the processor 202 may be configured to prioritize the output and display of the one or more content types 302 in accordance with one or more user preferences, such as based on a date, at least one of the content types, or any combination thereof. By way of example, the processor 202 may be configured to prioritize the display of the outputted list 400 including the one or more content types 302 based on sorting the list by chronological order, such as by earliest date or by most recent date. Additionally or alternatively, the processor 202 may be configured to prioritize the display of the outputted list 400 including the one or more content types 302 based on filtering the list by a type of the one or more content types, such as case law, briefs, pleadings and motions, verdicts and settlements, dockets, or any combination thereof. Still further, the processor 202 may be configured to prioritize the display of the outputted list 400 including the one or more content types 302 based on the most relevant keyword(s) of the search query 301. For example, a degree of relevance may be determined based on the deployed search, as explained herein, and a particular content type(s) 302 found to have a degree of relevance higher than a predetermined threshold may be prioritized for inclusion to display as part of the outputted list 400.

In certain embodiments, the processor 202 may be configured to aggregate the one or more content types into a single document. In this manner, the processor 202 may be configured to generate one or more single documents, such as whole matter documents that may each include one or more content types 302, which are then used to search against the keywords of the search query 301. The processor 202 may be configured to deploy the search against the single document based on the input. The processor 202 may be configured to generate, based on searching against the single document, an output comprising one or more links corresponding to each of the one or more content types 302.

For example, the selection of a first link may correspond to a first content type including case law, and the selection of a second link may correspond to a second content type including verdicts and settlements. Without limitation, the selection of the first link may be performed by the user device 102, such as via activation of a button associated with the first link. In other embodiments, it is not necessary for the processor 202 to be configured to generate and transmit the prompt requesting the selection of the one or more links that correspond to the one or more content types 302.

The processor 202 may be configured to generate a display including the selection of the one or more links corresponding to the one or more content types 302. By way of example, the processor 202 may be configured to generate the display, such as on a display screen of the user device 102, that includes the first link and/or the first content type including the case law that is associated with the search query 301. Additionally or alternatively, the processor 202 may be configured to generate the display that includes the second link and/or the second content type including the verdicts and settlements that is associated with the search query 301.

Still further, the processor 202 may be configured to receive, from the user device 102, a selection of the one or more links corresponding to the one or more content types 302. The processor 202 may be configured to generate a display including the selection of the one or more links corresponding to the one or more content types 302. In certain embodiments, the processor 202 may be configured to generate and transmit a prompt, to the user device 102, requesting a selection of the one or more links that correspond to the one or more content types. In certain embodiments, the processor 202 may be configured to receive, in response to the prompt, the selection of the one or more links that correspond to the one or more content types 302.

FIG. 3 depicts a schematic diagram of parsing legal search queries by the database clustering search system 100. As depicted in FIG. 3, a search query 301 may result in a hit in the one or more content types 302, such as a first legal content type (such as briefs, pleadings, and motions) as well as a hit in a second legal content type (such as dockets). Therefore, rather than having the processor 202 individually search each of these different legal content types, a single search query 301 by the processor 202 may return two different legal content types at once (here, briefs, pleadings, and motions as well as dockets). It is understood that the number of legal content types are not limited to those depicted in FIG. 3, and that any number of legal content types identifying a match of string in the search query may be included.

FIG. 4 depicts a schematic diagram of an output of parsing legal search queries. FIG. 4 depicts an exemplary result list 400, including one or more cases. It is understood that any number of cases and parties may be illustrated, and therefore not limited to only three cases with the respective parties (for example, as depicted in FIG. 4: 1. Parties in Case 1, such as Party A v. Party B 1; 2. Parties in Case 2, such as Party C v. Party D; 3. Parties in Case 3, such as Party E. v. Party F, et al.)).

It is further understood that the result list does not only take the form of a list, as other presentation formats may instead be presented, such as a chart, a graph, and the like. Each of these cases, or legal matters, may include a textual and/or graphic summary, as well as matter-level metadata (for example, a list of motion outcomes, settlement amount, etc.). Each of the legal matters may include one or more links (such as that which corresponds to the one or more content types 302), alongside a quantity appearing within the same box encompassing the one or more links. The quantity may refer to the number of instances for each of the one or more content types 302. For example, upon hovering or any of the one or more links, or clicking on the one or more links, the processor 202 may be configured to generate a pop-up window (or a new window, or a new tab) that is configured to display the corresponding result of the search query 301 found in the given legal content type.

Continuing with the output list 400 of FIG. 4, and by way of example, there may be one instance found in a docket; five instances found in case law opinions; twenty instances found in briefs, pleadings, and motions; and two instances found in verdicts and settlements. Thus, for Party A v. Party B, each content type 302 may include a corresponding quantity that has been searched and matched relative to the search query 301.

Figure 5:
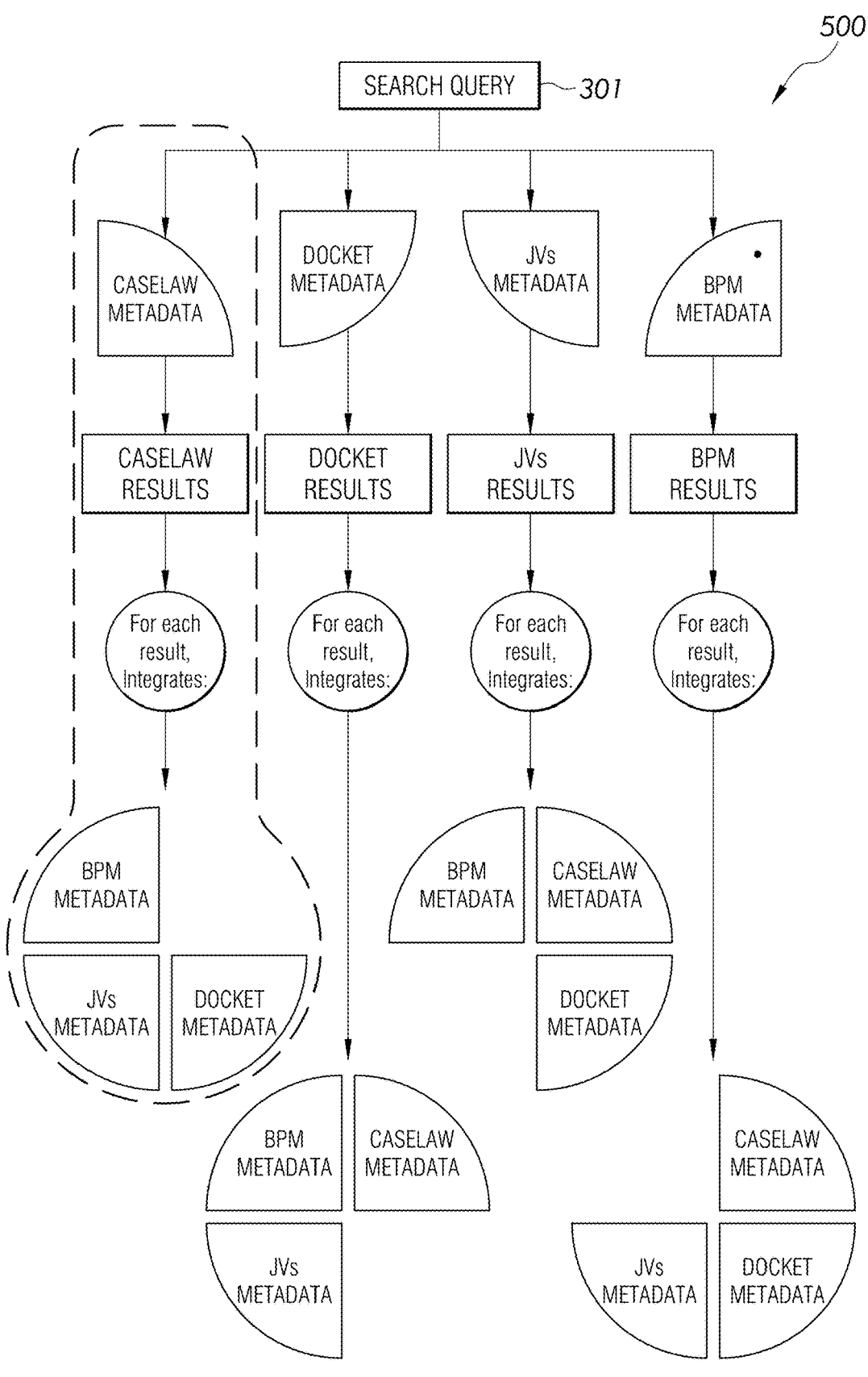
FIG. 5 depicts another schematic diagram of parsing legal search queries by the database clustering search system of FIG. 1 according to one or more aspects shown and described herein.

FIG. 5 depicts another schematic diagram of parsing legal search queries by the database clustering search system 100.

For example, FIG. 5 depicts, as shown at the parsing process 500 of various use cases that implement the knowledge graph. For example, responsive to a first user search query 301 in a first legal content type (such as case law), results thereto may be integrated with additional legal content types (such as briefs, pleadings, and motions, verdicts & settlements, and dockets) and presented to the user as a list 400 that includes corresponding links for each of the content types 302 and is also customizable for display on the user device 102. In another examples, responsive to a second search query 301 in a second legal content type (such as dockets), results thereto may be integrated with additional legal content types (such as briefs, pleadings, and motions, case law, and verdicts & settlements), and presented to the user as a list 400 that includes corresponding links for each of the content types 302 and is also customizable for display on the user device 102. These use cases illustrate the integration and breadth of integrating results of a user search query 301, initially within a first legal content type, with other legal content types.

Presently, it is not possible to search legal docket sheets for substantive keywords as docket sheets only list limited information, such as party names, attorneys, dates, and the like. However, it may be beneficial to efficiently search docket sheets using substantive keywords to search across documents that are part of that docket. For example, for a given subject matter (such as product liability), it is desirable to better understand the landscape of related product liability cases, the outcome of the related cases, any related litigation associated with the related cases, etc. In addition, it is beneficial to know which attorneys, law firms, and judges have been listed, associated, or otherwise affiliated with the related cases. As an example, a user may want to know the attorneys who worked on cases involving a car crash resulting in a broken leg. Docket sheets may not be searched for this example because they do not include details of the case.

In view of the above, the systems and methods disclosed herein provide for efficient searching of docket sheets using substantive key words. For example, a user may input the keywords (e.g., car accident, broken leg, etc.) which causes a normal opinion search, which would return all of the opinions having hits for those keywords. The search system 104, such as via the processor 202, may than retrieve the docket number for each opinion having a hit, to thereby create a docket sheet result list for the keyword search, and the docket sheet result list from other legal content types 302 may be identified and/or customized for presentation to the user via the user device 102. For example, the docket sheet result list may be available for viewing, editing, and/or copying by the user.

In particular, one or more content types 302 may be queried (in some examples, simultaneously via the single database 110) by the processor 202, and from this information, docket numbers may be extracted by the processor 202 to populate a docket result list that is provided to the user via the user device 102 and customized in accordance with the one or more user preferences, and is based on all of the content types 302 in which search results indicated a corresponding match or relevant hit for the search.

By way of example, there may be a thousand briefs, pleadings, and motions that are returned for a user search performed on a drunk driver causing a broken leg. From these thousands of briefs, pleadings, and motions, every docket listed may be provided to the user as a result list 400. In this manner, the dockets themselves may be searched by the processor 202 by substance, such as drunk driver causing a broken leg. Thus, the docket numbers may be extracted by the processor 202 and the docket sheets can be obtained, in which the user is displayed a derived list of docket sheets that came from the other legal content types 302. The compilation of the derived list of docket sheets may be performed by the knowledge graph, which is explained above. In particular, and with reference to the example for a drunk driver causing a broken leg, the knowledge graph, via the processor 202, may be configured to analyze each of the results for each legal content type (for example, a first number of results for briefs, pleadings, and motions, a second number for jury verdicts & settlements, and a third number for case law opinions), identify the docket that it is derived from, obtain the corresponding docket sheet, and display the docket sheet to the user via the user device 102.

Still further, any of the operations disclosed herein may be performed by the one or more processors of the search system, and also include a corresponding method and a non-transitory computer-readable medium comprising instructions that, when executed by at least one processor, cause the at least one processor to perform operations is provided, the operations comprising operations of the method.

Figure 6:
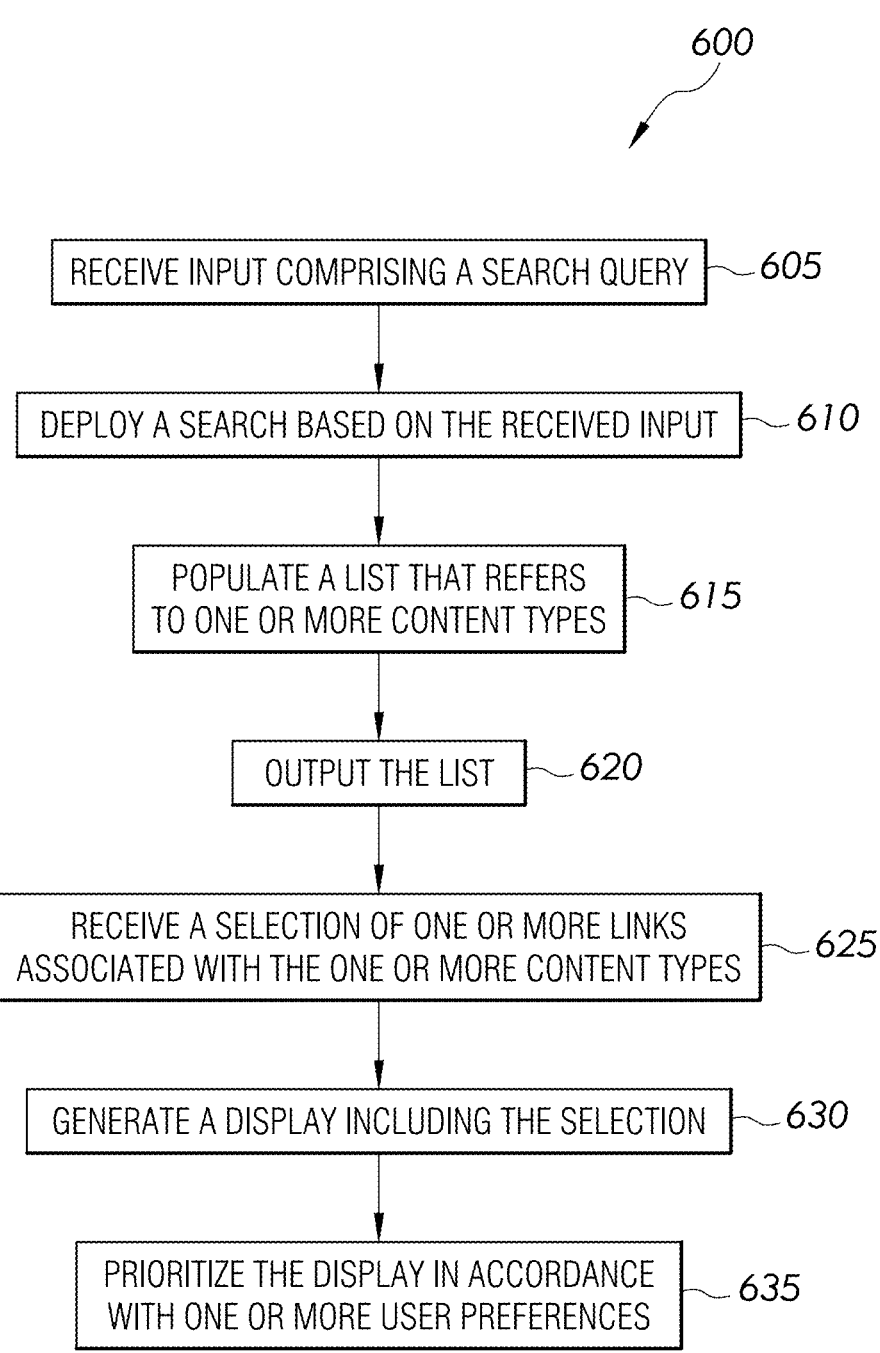
FIG. 6 depicts a flow diagram of an illustrative method performed by the illustrative search system of FIG. 2 according to one or more aspects shown and described herein.

FIG. 6 depicts a flow diagram of an illustrative method 600 performed by the illustrative search system 104. For purposes of brevity, the below blocks for the method 600 may be carried out with reference to the constituent components and operations of the processor 202 previously explained above with respect to any of FIGS. 1 to 5.

At block 605, the method 600 may include receiving an input including a search query. By way of example, the search query 301 may contain one or more keywords associated with a legal matter that is desired to be found within a database 110, and more particularly, within one or more content types of a single database 110, as will be further explained below. The search query 301 may be input from the user device 102.

At block 610, the method 600 may include deploying a search based on the received input. In certain embodiments, the processor 202 may be configured to deploy the search based on the input against the database 110 including the one or more content types 302. For example, the processor 202 may be configured to deploy the search based on the received input against one or more relevant keywords found in a content type 302, such as briefs, pleadings and motions, stored in the database 110. The one or more relevant keywords may be searched by the processor 202 against stored keywords in the database 110 to determine a type of match, such as an exact match or a partial match, of where the keyword(s) appear within the pleadings and motions content type 302.

Still further, the one or more relevant keywords may be searched by the processor 202 against other stored keywords in the database 110 for other content types 302, and is not limited to a single content type. For example, the one or more relevant keywords of the search query 301 may be extracted by the processor 202 and searched, simultaneous, against one or more relevant keywords found in a case law content type and a dockets content type stored in the database 110.

At block 615, the method 600 may include populating a list that refers to one or more content types. By way of example, and without limitation, the one or more content types 302 may include case law, briefs, pleadings and motions, verdicts and settlements, dockets, or any combination thereof, as previously discussed.

At block 620, the method 600 may include outputting the list. In certain embodiments, the processor 202 may be configured to output the list 400 to the user device 102. The processor 202 may be configured to output, to the user device 102, including additional information. For example, the additional information may include one or more links that correspond to each of the one or more content types 302. In certain embodiments, the processor 202 may be configured to generate and transmit a prompt, to the user device 102, requesting a selection of the one or more links that correspond to the one or more content types 302. In certain embodiments, the processor 202 may be configured to receive, in response to the prompt, the selection of the one or more links that correspond to the one or more content types 302.

For example, the selection of a first link may correspond to a first content type including case law, and the selection of a second link may correspond to a second content type including verdicts and settlements. Without limitation, the selection of the first link may be performed by the user device 102, such as via activation of a button associated with the first link. In other embodiments, it is not necessary for the processor 202 to be configured to generate and transmit the prompt requesting the selection of the one or more links that correspond to the one or more content types 302. At block 625, the method 600 may include receiving a selection of one or more links associated with the one or more content types.

At block 630, the method 600 may include generating a displaying including the selection. By way of example, the processor 202 may be configured to generate the display, such as on a display screen of the user device 102, that includes the first link and/or the first content type including the case law that is associated with the search query 301. Additionally or alternatively, the processor 202 may be configured to generate the display that includes the second link and/or the second content type including the verdicts and settlements that is associated with the search query 301. Prior to, or after output of the list, in certain embodiments, the processor 202 may be configured to prioritize the output and display of the one or more content types 302 in accordance with one or more user preferences, such as based on a date, at least one of the content types, or any combination thereof. By way of example, the processor 202 may be configured to prioritize the display of the outputted list 400 including the one or more content types 302 based on sorting the list by chronological order, such as by earliest date or by most recent date. Additionally or alternatively, the processor 202 may be configured to prioritize the display of the outputted list 400 including the one or more content types 302 based on filtering the list by a type of the one or more content types, such as case law, briefs, pleadings and motions, verdicts and settlements, dockets, or any combination thereof. Still further, the processor 202 may be configured to prioritize the display of the outputted list 400 including the one or more content types 302 based on the most relevant keyword(s) of the search query 301. For example, a degree of relevance may be determined based on the deployed search, as explained herein, and a particular content type(s) 302 found to have a degree of relevance higher than a predetermined threshold may be prioritized for inclusion to display as part of the outputted list 400.

At block 635, the method 600 may include prioritizing the display in accordance with one or more user preferences.

It should now be understood that the systems and methods described provide for searching across various the different legal content types using a single search by use of a knowledge graph. The knowledge graph is defined by one or more clusters of a legal matter by pulling together the case law opinions, dockets, jury verdicts and settlements, and briefs, pleadings, and motions from a case. The knowledge graph is itself queried to return search results, for example as part of a list, that is responsive to the search query and whose display output is also customizable and also prioritized by the user in accordance with one or more user preferences. Furthermore, the systems and methods disclosed herein also provide for searching across legal dockets to extract particular information therefrom using the knowledge graph. Consequently, this reduces or eliminates the need for querying multiple databases as well as providing customization for the output including its display in accordance with one or more user preferences, thereby avoiding system overload and generic system output issues.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Reference to an element in the singular is not intended to mean only one unless specifically so stated, but rather "one or more." For example, reference to an element (e.g., "a processor," "a memory," etc.), unless otherwise specifically stated, should be understood to refer to one or more elements (e.g., "one or more processors," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein include one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A database clustering search system, comprising:

a processor; and a non-transitory, processor readable storage medium communicatively coupled to the processor, the non-transitory, processor readable storage medium comprising one or more instructions stored thereon that, when executed, cause the processor to:

generate a knowledge graph that includes one or more clusters associated with one or more content types, the one or more content types including one or more legal content types;

receive input comprising a search query;

deploy a search against the knowledge graph based on the input;

populate, based on the search, a list that refers to the one or more content types; and output the list to a user device in accordance with one or more user preferences, and prioritize display of the list including the one or more legal content types based on a degree of relevance relative to a predetermined threshold.

2. The database clustering search system according to claim 1, wherein the one or more instructions further cause the processor to:

output, to the user device, the list to the user device along with one or more links corresponding to each of the one or more content types;

receive, from the user device, a selection of the one or more links corresponding to the one or more content types; and generate a display including the selection of the one or more links corresponding to the one or more content types.

3. The database clustering search system according to claim 1, wherein the one or more legal content types include case law, briefs, pleadings and motions, verdicts and settlements, dockets, or any combination thereof.

4. The database clustering search system according to claim 1, wherein the one or more instructions further cause the processor to deploy the search based on the input against a single database including the one or more content types.

5. The database clustering search system according to claim 1, wherein the one or more instructions further cause the processor to:

aggregate the one or more content types into a single document;

deploy the search against the single document based on the input; and generate, based on searching against the single document, an output comprising one or more links corresponding to each of the one or more content types.

6. The database clustering search system according to claim 5, wherein the one or more instructions further cause the processor to:

receive, from the user device, a selection of the one or more links corresponding to the one or more content types; and generate a display including the selection of the one or more links corresponding to the one or more content types.

7. The database clustering search system according to claim 1, wherein the one or more user preferences include a rank, a date, a name, a particular legal content type, or any combination thereof.

8. A method, comprising:

generating a knowledge graph that includes one or more clusters associated with one or more content types, the one or more content types including one or more legal content types;

receiving input comprising a search query;

deploying a search against the knowledge graph based on the input;

populating, based on the search, a list that refers to the one or more content types; and outputting the list to a user device in accordance with one or more user preferences, and prioritizing display of the list including the one or more legal content types based on a degree of relevance relative to a predetermined threshold.

9. The method of claim 8, further comprising:

outputting, to the user device, the list to the user device along with one or more links corresponding to each of the one or more content types;

receiving, from the user device, a selection of the one or more links corresponding to the one or more content types; and generating a display including the selection of the one or more links corresponding to the one or more content types.

10. The method of claim 8, wherein the one or more legal content types include case law, briefs, pleadings and motions, verdicts and settlements, dockets, or any combination thereof.

11. The method of claim 8, further comprising deploying the search based on the input against a single database including the one or more content types.

12. The method of claim 8, the one or more operations further comprising:

aggregating the one or more content types into a single document;

deploying the search against the single document based on the input; and generating, based on searching against the single document, an output comprising one or more links corresponding to each of the one or more content types.

13. The method of claim 12, further comprising:

receiving, from the user device, a selection of the one or more links corresponding to the one or more content types; and generating a display including the selection of the one or more links corresponding to the one or more content types.

14. A non-transitory, computer-readable medium comprising instructions that, when executed by at least one processor, cause the at least one processor to perform one or more operations comprising:

generating a knowledge graph that includes one or more clusters associated with one or more content types, the one or more content types including one or more legal content types;

receiving input comprising a search query;

deploying a search against the knowledge graph based on the input;

populating, based on the search, a list that refers to the one or more content types; and outputting the list to a user device in accordance with one or more user preferences, and prioritizing display of the list including the one or more legal content types based on a degree of relevance relative to a predetermined threshold.

15. The non-transitory, computer-readable medium of claim 14, the one or more operations further comprising:

outputting, to the user device, the list to the user device along with one or more links corresponding to each of the one or more content types;

receiving, from the user device, a selection of the one or more links corresponding to the one or more content types; and generating a display including the selection of the one or more links corresponding to the one or more content types.

16. The non-transitory, computer-readable medium of claim 14, wherein the one or more legal content types include case law, briefs, pleadings and motions, verdicts and settlements, dockets, or any combination thereof.

17. The non-transitory, computer-readable medium of claim 14, the one or more operations further comprising deploying the search based on the input against a single database including the one or more content types.

18. The non-transitory, computer-readable medium of claim 14, the one or more operations further comprising:

aggregating the one or more content types into a single document;

deploying the search against the single document based on the input; and generating, based on searching against the single document, an output comprising one or more links corresponding to each of the one or more content types.

19. The non-transitory, computer-readable medium of claim 18, the one or more operations further comprising:

receiving, from the user device, a selection of the one or more links corresponding to the one or more content types; and generating a display including the selection of the one or more links corresponding to the one or more content types.

\* \* \* \* \*